United States Patent [19]
Jackson et al.

[11] 3,843,642
[45] Oct. 22, 1974

[54] CEPHALOSPORIN C DERIVATIVES
[75] Inventors: Billy G. Jackson; Martha C. Stamper; Edmond M. Bottorff, all of Indianapolis, Ind.
[73] Assignee: Eli Lilly and Company, Indianapolis, Ind.
[22] Filed: Nov. 13, 1972
[21] Appl. No.: 306,130

[52] U.S. Cl. .............................. 260/243 C, 424/246
[51] Int. Cl. ............................................ C07d 99/24
[58] Field of Search ................................ 260/243 C

[56] References Cited
UNITED STATES PATENTS
3,227,709  1/1966  Patchett et al. ................. 260/243 C
3,234,222  2/1966  Fechtig et al. ................... 260/243 C
3,522,248  7/1970  Vosen ............................. 260/243 C Primary Examiner—Nicholas S. Rizzo
Attorney, Agent, or Firm—William C. Martens; Everet F. Smith

[57] ABSTRACT

N-(4-chlorobenzoyl)- and N-(2,4-dichlorobenzoyl)-cephalosporin C values are useful in processes for separating the cephalosporin C values from fermentation liquors containing polysaccharide and proteinaceous impurities. These new intermediates can be used as starting materials in cleavage processes for forming 7-amino-cephalosporin values, and the 7-amino cephalosporin values can be used to form cephalosporin antibiotics such as cephalothin, cephaloridine, and cephalexin.

3 Claims, No Drawings

CEPHALOSPORIN C DERIVATIVES

INTRODUCTION AND BACKGROUND OF THE INVENTION

This invention relates to a process for separating cephalosporin C values from impurities derived from fermentation liquors and includes the formation of novel derivatives of such cephalosporin C values. This invention relates also to a process which uses the novel derivatives of the cephalosporin C values to prepare 7-amino-cephalosporanic acid (7-ACA). Additionally, this invention provides new derivatives of cephalosporin C values useful in forming 7-aminocephalosporanic acid.

Cephalosporin C, obtained by fermentation, has the following structure:

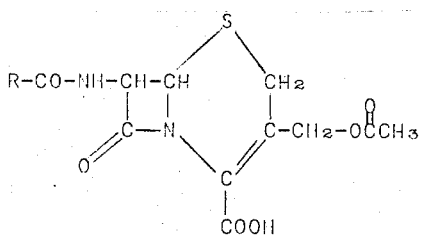

in which R is $HOOC-CH(NH_2)-(CH_2)_3-$. It is also known as 7-(5'-aminoadipamido)-cephalosporanic acid and is claimed in U.S. Pat. No. 3,093,638. It has weak antibiotic activity; however, it is important as a source of the cephalosporin C nucleus, namely, 7-aminocephalosporanic acid (7-ACA), having the following structure:

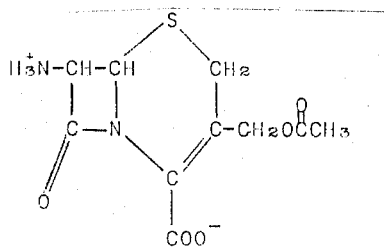

It is shown here in the form of its zwitterion, although anionic and cationic salts can be formed and used. Antibiotics, such as cephalothin (U.S. Pat. No. 3,218,318) and cephaloridine (U.S. Pat. No. 3,449,338) are prepared from 7-ACA by known methods. Various derivatives of 7-ACA can be prepared by reacting the 7-amino group of 7-ACA with an appropriate acylating agent, such as an acid, an acyl halide, or any other active form and/or by replacing the acetoxy group at the methyl carbon in the 3-position with any of the appropriate nucleophilic groups now well documented in the literature. Thus it can be seen that cephalosporin C is a valuable fermentation-derived antibiotic and is of special interest as starting material in the production of other more potent antibiotics.

As mentioned above, this invention in part involves a method for extracting and purifying cephalosporin C values from aqueous fermentation liquors in which they have been produced as well as from partially purified fermentation broths and "resin eluates" containing cephalosporin C values. This is achieved by conversion of the cephalosporin C value to its corresponding N-(4-chlorobenzoyl)- or N-(2,4-dichlorobenzoyl)- derivative, and, thus, before cleavage of the 7-aminoadipoyl group from the cephalosporin C value.

The term "cephalosporin C values" is used herein to mean cephalosporin C and cephalosporin C-like compounds such as desacetyl cephalosporin C, desacetoxy cephalosporin C, and 3-methylthiomethyl cephalosporin C, each of which can be produced by recognized fermentation processes.

U.S. Pat. No. 3,160,631 describes the acylation of the sodium salt of cephalosporin C. The salt is dissolved in water and treated with sodium bicarbonate and acetone at 0°C. The resulting mixture is treated with benzoyl chloride in acetone. The reaction mixture then is extracted with chloroform, acidified, and the N-acylated cephalosporin C is extracted with methyl isobutyl ketone. The N-acyl cephalosporin C alkyl diesters defined in that patent are recovered by the process involving complex and extensive use of organic solvents.

U.S. Pat. No. 3,234,223 describes the use of a 2,4-dinitrophenyl substituent as protecting group of the free amino function of cephalosporin C during cleavage of the cephalosporin C to obtain 7-aminocephalosporanic acid. However, this patent does not disclose a method for obtaining the 2,4-dinitrophenyl-protected cephalosporin C starting material, and no evidence of crystallinity of the free acid 2,4-dinitrophenyl-protected cephalosporin C is provided.

U.S. Pat. No. 3,467,654 describes the use of acetone in the cephalosporin C initial broth filtrate to precipitate impurities therefrom, adsorption of the cephalosporin C from the purified filtrate using an anion exchange resin, and elution of the cephalosporin C from the resin using an acid buffer.

One of the problems inherent in the use of the sodium salt of cephalosporin C as starting material in the preparation of 7-aminocephalosporanic acid (7-ACA) and, ultimately, of cephalothin and/or cephaloglycin antibiotics is attributable to the fact that, in the recovery of the sodium salt of cephalosporin C produced by fermentation, high molecular weight polysaccharides and proteins are present as impurities. These polysaccharide and protein by-products are co-produced during the fermentation and have solubility characteristics similar to those of the sodium salt of cephalosporin C. These solubility characteristics make removal of the impurities from cephalosporin C values difficult. A procedure such as membrane filtration has been successful in removing these impurities; however, this procedure is not presently adaptable to filtering the large volumes of fermentation liquors generated in a manufacturing operation. Furthermore, purification of the sodium salt of cephalosporin C by recrystallization is only partially successful because the conditions which are employed also produce precipitation of the impurities.

The high molecular weight polymeric impurities, loosely termed herein "polysaccharides" give rise to several problems in the synthesis of cephalosporin antibiotics such as cephalothin. Cleavage of the sodium salt of cephalosporin C to 7-ACA using chloroform as solvent involves separation of an aqueous phase (containing 7-ACA) from the organic (chloroform) phase. Presence of the "polysaccharides" makes this separation difficult because the "polysaccharides" tend to stabilize a chloroform-water emulsion. A more recently developed tetrahydrofuran cleavage process was devised to circumvent the emulsion difficulty; this new process derives its success from the fact that no organic phase-aqueous phase separation is necessary. However, experience has shown that the tetrahydrofuran process merely shifts the problem to the next step, since considerable difficulty is encountered in acylating the 7-ACA which is obtained from the tetrahydrofuran procedure.

Thus, a need remains for a method of avoiding the presence of detrimental quantities of "polysaccharides" in cephalosporin C values. Such a method would enhance cephalosporin conversions, such as, for example, the cephalosporin C to cephalothin process sequence. One possible solution to this problem resides in finding derivatives of cephalosporin C values which have solubility characteristics differing markedly from those of the "polysaccharide" impurities, for example, derivatives which are soluble in organic solvents but insoluble in water.

The search for a cephalosporin C derivative which has these desired properties has not been easy, and the finding of such a suitable derivative has been entirely unexpected. Various N-(protected) cephalosporin C derivatives have been made and studied for possible use as intermediates in the process for making 7-aminocephalosporanic acid (7-ACA) from cephalosporin C. However, most of those examined do not readily form the desired crystalline free acid from an aqueous-organic solvent system. For example, the free acid forms of N-(p-nitrobenzoyl)-cephalosporin C, N-(p-toluenesulfonyl)cephalosporin C, N-(benzenesulfonyl)cephalosporin C and N-(p-chlorobenzenesulfonyl)cephalosporin C do not form crystalline products. In addition, the free acid forms of N-propionyl-, N-benzoyl-, and N-chloroacetyl-cephalosporin C do not readily crystallize from an aqueous-organic solvent system. However, certain cephalosporin C derivatives have been discovered which exhibit desirable solubility characteristics capable of being employed to advantage in processes for preparing 7-ACA and/or other similar 7-amino cephalosporin compounds.

It is an object of this invention to provide new derivatives of cephalosporin C values which have solubility characteristics markedly different from those of "polysaccharides," cephalosporin C values, and salts of cephalosporin C values. Specifically, the new derivatives of cephalosporin C values are soluble in common organic solvents and insoluble in water.

It is a further object of this invention to provide an improved process for separating cephalosporin C values from crude solutions thereof. This improved process envisions the conversion of cephalosporin C values to selected derivatives, and this conversion enable the ready separation of insoluble "polysaccharide" impurities from soluble derivatives of cephalosporin C values. The improved process additionally permits the crystallization of the derivatives of cephalosporin C values free from contaminating "polysaccharides" and the processing of the derivatives to form 7-ACA and/or other 7-amino cephalosporins.

SUMMARY OF THE INVENTION

Briefly, this invention provides an improved process for separating a cephalosporin C value of the formula

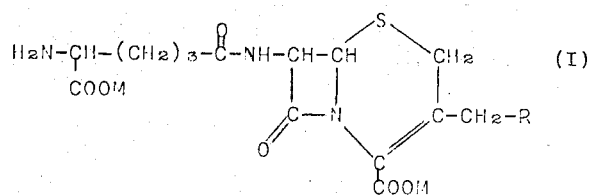

in which each M is hydrogen or an alkali metal, and R is hydrogen, acetoxy, hydroxy, or methylthio, from polysaccharide and proteinaceous impurities, which comprises A. reacting the crude cephalosporin C value of formula (I) in an aqueous liquid medium containing a miscible, inert organic solvent and containing said impurities with a 2,4-dichlorobenzoyl halide or a 4-chlorobenzoyl halide to form a compound of the formula (II)

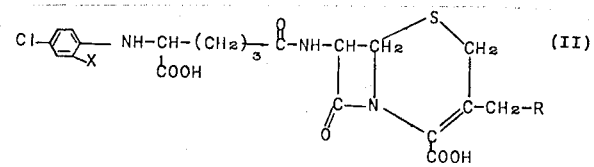

in which X is hydrogen or chlorine and R is as defined above, which compound is soluble in the aqueous-organic liquid medium;

B. separating insoluble polysaccharide and proteinaceous impurities from the liquid medium of step (A);

C. treating the liquid medium of step (B) to crystallize the compound of formula (II);

D. separating the crystalline compound of formula (II) from the liquid medium of step (C);

E. dissolving the separated compound of formula (II) in an organic aprotic water-miscible liquid solvent containing up to about 15% water;

F. separating insolubles from the liquid mixture obtained in step (E);

G. treating the liquid fraction from step (F) with an aqueous medium to effect recrystallization of the compound of formula (II); and H. separating the crystalline compound of formula (II) from the liquid mixture.

In further operation of the process of this invention, the compound of formula II is treated to cleave the 7-acyl side chain and to form the 7-amino cephalosporin nucleus compound.

Compounds of formula II are believed to be new and also form a part of this invention.

DETAILED DESCRIPTION OF THE INVENTION

According to this invention, it has been discovered that the N-(4-chlorobenzoyl)- and N-(2,4-dichlorobenzoyl)-derivatives of cephalosporin C and related compounds (formula II above) have properties which differ markedly from those of cephalosporin C values and salts thereof. Specifically, it has been discovered that crude cephalosporin C values containing impurities derived from fermentation liquors can be purified by a particular sequence. This sequence involves converting the crude cephalosporin C value to its corresponding derivative II in the presence of an aqueous medium containing a water-miscible inert organic solvent. By "inert" is meant an organic solvent which will not react with the 2,4-dichlorobenzoyl halide or 4-chlorobenzoyl halide employed in preparing the derivative of the cephalosporin C value. Typical water-miscible inert organic solvents include, for example, ketones, such as acetone and the like; ethers, such as dioxane, tetrahydrofuran, dimethoxyethane, diethoxyethane, and the like; and nitriles, such as acetonitrile, and the like.

Under these conditions it has been found that the produced derivative of the cephalosporin C value remains soluble in the medium while a major portion of the impurities, variously termed "polysaccharides," polymeric impurities, and the like, remain insoluble.

The impurities are separated, for example, by filtration, decantation, centrifugation, filter press procedures, or the like, and the derivative of the cephalosporin C value in the form of its free acid is recovered from the partially purified solution thereof, for example, by lowering the pH of the mixture to a moderately acidic range, for example, from about pH 1.5 to about pH 3.5, and/or by addition of water to diminish the solubility of the derivative in the medium.

The thus-recovered derivative of the cephalosporin C value is then subjected to recrystallization under controlled conditions designed to eliminate residual amounts of the polymeric impurities. This is achieved by dissolving the derivative in an organic aprotic water-miscible solvent. Typical such aprotic solvents include, for example, ketones, such as acetone, and the like; ethers, such as dioxane, tetrahydrofuran, dimethoxyethane, diethoxyethane, and the like; and nitriles, such as acetonitrile, and the like. The organic aprotic water-miscible solvent preferably contains a minor amount of water, up to about 15%.

Under these conditions of recrystallization, residual amounts of the impurities remain insoluble and are readily removed by any of the hereinbefore mentioned techniques. The derivative of the cephaloporin C value is precipitated from the thus-purified solution by addition of water and is separated in the form of its free acid.

The cephalosporin C values employed as starting materials in the process of this invention can be in the form of their free acid in which case M in formula I is hydrogen. Alternatively and preferably, the cephalosporin C value is in the form of its alkali metal salt, such as the lithium, sodium, or potassium salt. Most preferably, the conditions of the process of this invention are such that the cephalosporin C value starting material is in the form of its sodium salt.

Cephalosporin C derivatives of the formula II, that is, compounds in which R is acetoxy, can be prepared in excellent yield from the alkali metal salt, preferably the sodium salt, of cephalosporin C. When the sodium salt of cephalosporin C contains relatively little "polysaccharide" impurity, it or its derivatives having the structure of formula II can be cleaved to 7–ACA in chloroform without troublesome emulsions developing. However, if the "polysaccharide" content of the sodium salt of cephalosporin C or its unpurified formula II derivative is relatively large, substantial emulsion problems develop upon cleavage in a chloroform medium. However, recrystallization of the cephalosporin C derivative II employing conditions which exploit the differences in solubility between the derivative and the "polysaccharide" impurities produces a material which can be cleaved to 7–ACA in chloroform without substantial emulsion difficulties. Such a material is produced irrespective of the amount of "Polysaccharide" present in the cephalosporin C starting material from which the cephalosporin C derivative was obtained.

Additional benefits arising from the use of the derivatives of cephalosporin C values are:

1. Increased yields in the cleavage to 7-amino cephalosporins from cephalosporin C values.
2. Excellent quality of the produced 7-amino cephalosporins such that problems in the subsequent acylation reaction are minimized or completely avoided.
3. Reduced amounts of impurities in the intermediate products prepared in the sequence of production of the ultimate antibiotic.
4. Increased yields in acylation of the 7-amino cephalosporins to the ultimate antibiotic. Specifically, it has been discovered that the yield in acylation of 7–ACA to cephalothin increases from about 79% when carried out in the presence of "polysaccharide" impurities to about 92% when such impurities have been substantially eliminated from the 7–ACA starting material.

The invention is further illustrated by the following detailed examples which are not intended to be limiting upon the scope thereof.

Example 1

A 60 gram portion of the sodium salt of cephalosporin C (128 millimoles) is stirred with 300 ml. of de-ionized water until solution is complete. About 300 ml. of acetone is added. The mixture is stirred and cooled to 5°C. during which time a precipitate of the sodium salt of cephalosporin C separates. The pH of the mixture is adjusted to the range of from 9.0 to 9.5 by addition of aqueous 20% sodium hydroxide solution. To the resulting solution, maintained at about 5°c., 19.7 ml. of 2,4-dichlorobenzoyl chloride (141 millimoles, 10% excess) are added with stirring over a period of 30 to 35 minutes. The pH of the mixture is maintained at 9.0 to 9.5 during addition of the 2,4-dichlorobenzoyl chloride by addition as needed of aqueous 20% sodium hydroxide solution. Upon completion of addition of the 2,4-dichlorobenzoyl chloride, the mixture is stirred at 5°C. for 10 minutes or until the pH remains steady at 9.0 to 9.5 for 2 minutes. The mixture then is acidified with concentrated hydrochloric acid to pH 6.5. The resulting mixture is treated with 300 ml. of water followed by 5 to 10 grams of a filter aid (Hyflo). The mixture is filtered through the filter aid (about ¼ to ½ inch thick on a size 3 Buchner funnel). The precipitate is rinsed with about 50 ml. of water. The filtrate and the rinsings are combined, stirred, and warmed to 20°C. Concentrated hydrochloric acid is added to adjust the pH of the mixture to about pH 3.0. The solution is seeded with crystals of the product, obtained from a small laboratory sample, and the pH is adjusted to 2.7 with concentrated hydrochloric acid. The mixture is stirred for 30 minutes at 20° to 23°C. during which time N-(2,4-dichlorobenzoyl) cephalosporin C crystallizes (it oils out at first and then the oil droplets solidify). The mixture is acidified with concentrated hydrochloric acid to pH 1.8, stirred for about 2 to 3 minutes, and 300 ml. of water is added. The aqueous organic mixture is stirred for 2 to 3 minutes, cooled to 5°C., and stirred at 0° to 5°C. for 1 hour. The product is filtered, rinsed with about 500 ml. of water, and vacuum dried at 45°C. to obtain 68.0 grams (89.1%).

A mixture of 20.0 grams of the N-(2,4-dichlorobenzoyl)-cephalosporin C product in 180 ml. of acetone, reagent grade, is stirred until a uniform mixture is obtained, and 9.0 ml. of de-ionized water is then added. The mixture is stirred until the product is dissolved (about 10 to 15 minutes). To the resulting solution are added 2 grams of a filter aid (Hyflo) and 2 grams of a decolorizing charcoal (Darco). The mixture is stirred for 5 minutes and then filtered through a filter aid pad (about 1 gram in a size 0 Buchner funnel). Filtration is repeated, omitting the decolorizing charcoal, until the filtrate is clear, and the minor amount of precipitate is rinsed with up to 20 ml. of acetone. The filtrate and rinsings are combined and stirred with 250 ml. of de-ionized water. The mixture is cooled to 25°C., and de-ionized water is added until the first trace of cloudiness persists, (after about 75 to 110 ml. of water is added). The mixture is then seeded with 0.50 grams of recrystallized product. The mixture is stirred for 30 minutes at ambient temperature (23°-25°C). About 350 ml. of water is added with stirring over a period of 40 minutes. Upon completion of the water addition, the mixture is cooled and maintained at 5°C. for 1 hour. The resulting mixture is filtered, washed with water and dried in vacuo at 45°C. The yield of N-(2,4-dichlorobenzoyl) cephalosporin C is 16–16.5 grams.

Example 2

A 60 g. (134 millimoles) portion of the sodium salt of cephalosporin C was stirred in 300 ml. of water until it dissolved. About 150 ml. of acetone was added, and the solution was stirred and cooled to 10°C. The pH of the solution was adjusted to pH 9.0 with aqueous 20% sodium hydroxide solution, and 17 ml. (134 millimoles) of 4-chlorobenzoyl chloride were added. The mixture was stirred at 10°–15°C. for 30 minutes during which time aqueous 20 percent sodium hydroxide solution was added in an amount sufficient to maintain the pH of the mixture at approximately 9.0. About 1,050 ml. of water, in two portions of 800 ml. and 250 ml., were then added, and the pH was adjusted to 1.9 with conc. hydrochloric acid. The mixture was seeded with crystals of N-(4-chlorobenzoyl) cephalosporin C and cooled in an ice-bath. The mixture was refrigerated (about 5°C.) overnight. The crystalline solid in the mixture was filtered, rinsed with water, and dried in vacuo at 40°C. The crystalline N-(4-chlorobenzoyl) cephalosporin C product weighted 55.7 g.

The partially purified N-(4-chlorobenzoyl) cephalosporin C is further purified by recrystallization in accordance with the procedure illustrated in Example 1.

Example 3

A 10.8 g. (20 millimoles) portion of N-(2,4-dichlorobenzoyl) cephalosporin C was stirred in 150 ml. of amylene-inhibited chloroform. To the above mixture 5.70 ml. (48 millimoles) of quinoline and 8.80 ml. (95 millimoles) of N,N-dimethylacetamide were added. The temperature of the mixture rose to about 28°C. The mixture was cooled to 15° C., and 9.60 ml. (135 millimoles) of acetyl chloride were added rapidly.

The temperature of the mixture rose to 23°C. The mixture was stirred at about 24°–25°C. for 40 minutes during which time the N-(2,4-dichlorobenzoyl)cephalosporin C dissolved. The mixture was then cooled to −35°C., and 26 ml. (162 millimoles) of N,N-diethylaniline were added. The mixture was re-cooled to −25°C., and 9.8 g. (47 millimoles) of phosphorus pentachloride were added. The mixture was stirred for 30 minutes at −15°C., cooled to −40°C., and 34 ml. of propylene glycol were added. The resulting mixture was stirred for 1 ½ – 2 hours at 0°C., cooled to −15°C., and 100 ml. of ice and water were added. The aqueous phase was separated from the organic phase, and the organic phase was extracted with 20 ml. of water. The aqueous phases were combined and adjusted to pH 3.5 with conc. ammonium hydroxide. A solid precipitated and was filtered, washed successively with water, methanol, and acetone, and dried to obtain 4.8 – 5.0 g. of 7-aminocephalosporanic acid.

Example 4

Following the procedure of Example 1, the sodium salt of desacetoxycephalosporin C (a compound of formula I in which R is hydrogen) is dissolved in a water-/acetone mixture and treated with 2,4-dichlorobenzoyl chloride to form N-(2,4-dichlorobenzoyl) desacetoxycephalosporin C acid. This derivative is purified in accordance with the procedure described in Example 1. The purified acid product, upon being treated with phosphorus pentachloride in the presence of pyridine, forms the imino-chloride; the imino-chloride, upon being treated with an alcohol or an alkanediol, forms the imino-ether; the imino-ether, upon treatment with water, cleaves the side chain to form 7-aminodesacetoxycephalosporanic acid (7–ADCA). This latter cephalosporin nucleus compound is named in U.S. Pat. No. 3,124,576 and can be used to prepare by known acylation procedures cephalosporin antibiotics such as cephalexin and cephradine.

We claim:
1. A compound of the formula

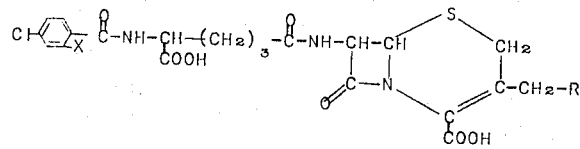

in which X is hydrogen or chlorine, and R is hydrogen, acetoxy, hydroxy, or methylthio.

2. Compound of claim 1, in which X is chlorine and R is acetoxy.

3. Compound of claim 1, in which X is hydrogen and R is acetoxy.

* * * * *